United States Patent [19]
Ota et al.

[11] Patent Number: 4,590,021
[45] Date of Patent: * May 20, 1986

[54] METHOD FOR PRODUCING POLYESTER CONTAINERS

[75] Inventors: Akiho Ota, Funabashi; Fumio Negishi, Katsushika, both of Japan

[73] Assignee: Yoshino Kogyosho Co., Ltd., Tokyo, Japan

[*] Notice: The portion of the term of this patent subsequent to Apr. 5, 2000 has been disclaimed.

[21] Appl. No.: 570,030

[22] Filed: Jan. 11, 1984

Related U.S. Application Data

[60] Continuation-in-part of Ser. No. 428,639, Sep. 30, 1982, abandoned, which is a continuation of Ser. No. 317,887, Nov. 3, 1981, Pat. No. 4,379,099, which is a continuation of Ser. No. 150,662, May 16, 1980, abandoned, which is a division of Ser. No. 19,913, Mar. 12, 1979, abandoned.

[30] Foreign Application Priority Data

Jun. 29, 1978 [JP] Japan ................... 53-89840
Jul. 4, 1978 [JP] Japan ................... 53-81340
Oct. 4, 1978 [JP] Japan ................... 53-124303

[51] Int. Cl.$^4$ .................. B29C 49/64; B29C 49/08
[52] U.S. Cl. ...................... 264/25; 264/520; 264/521; 264/532; 264/535; 264/235; 264/346
[58] Field of Search .............. 264/25, 519, 520, 521, 264/523, 529, 530, 532, 535, 235, 346; 215/1 C; 428/35, 910

[56] References Cited

U.S. PATENT DOCUMENTS

| | | | |
|---|---|---|---|
| 3,544,673 | 12/1970 | Inskeep | 264/235 |
| 3,555,135 | 1/1971 | Paul | 264/235 |
| 3,562,273 | 2/1971 | Schjeldahl et al. | 264/237 |
| 3,733,309 | 5/1973 | Wyeth et al. | 264/DIG. 33 |
| 3,948,404 | 4/1976 | Collins et al. | 215/1 C |
| 4,025,594 | 5/1977 | Agrawal | 264/235 |
| 4,039,641 | 8/1977 | Collins | 264/524 |
| 4,108,937 | 8/1978 | Martineu et al. | 264/529 |
| 4,150,079 | 4/1979 | Chang | 264/523 |
| 4,151,249 | 4/1979 | Lee | 264/520 |
| 4,179,488 | 12/1979 | Nishikawa et al. | 264/521 |
| 4,233,022 | 11/1980 | Brady et al. | 425/525 |
| 4,264,558 | 4/1981 | Jacobsen | 264/523 |
| 4,320,083 | 3/1982 | Jakobsen | 264/531 |
| 4,358,491 | 11/1982 | Ota et al. | 428/35 |
| 4,379,099 | 4/1983 | Ota et al. | 264/521 X |
| 4,385,089 | 5/1983 | Bonnebat et al. | 428/35 |

FOREIGN PATENT DOCUMENTS

| | | | |
|---|---|---|---|
| 2540930 | 4/1976 | Fed. Rep. of Germany | 264/538 |
| 0068385 | 1/1979 | Japan . | |
| 0068384 | 1/1979 | Japan . | |
| 57-201631 | 12/1982 | Japan | 264/521 |
| 2074932 | 11/1981 | United Kingdom | 264/521 |

*Primary Examiner*—Jan Silbaugh
*Attorney, Agent, or Firm*—Parkhurst & Oliff

[57] ABSTRACT

Spherulites are grown in such sections as neck, neck end, bottom center and/or bottom periphery of a hollow bottle-shaped container of biaxially oriented-blow molded polyethylene terephthalate (PET) resin where the resin is not substantially subjected to orientation, thereby to improve the thermal resistance, stiffness and content resistance of such sections to almost the same extent as the biaxially oriented sections of the container such as the shoulder and cylindrical sections thereof. The aforesaid non-oriented sections of the preformed piece before being blow-molded or of the blow-molded container are first heated at or above the glass transition temperature of the resin for about 2-8 minutes and are then annealed at room temperature, with the result that such sections have a spherulite texture of an increased density and are rendered opaque.

13 Claims, 11 Drawing Figures

U.S. Patent  May 20, 1986  Sheet 1 of 2  4,590,021
FIG. 1
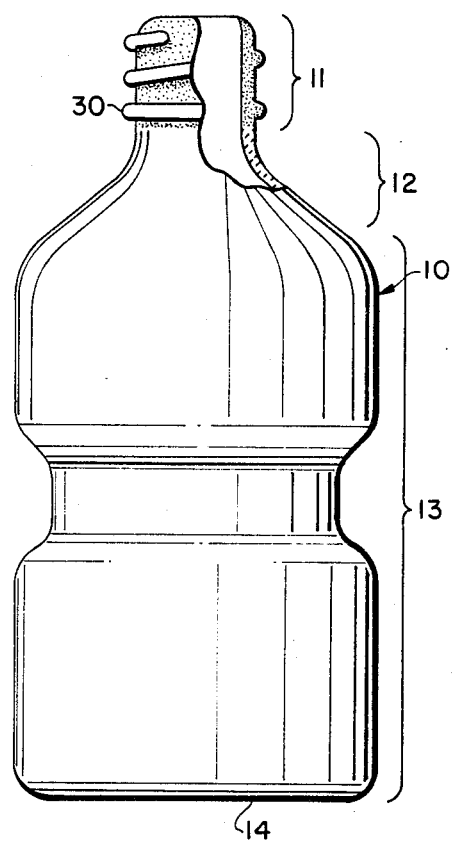
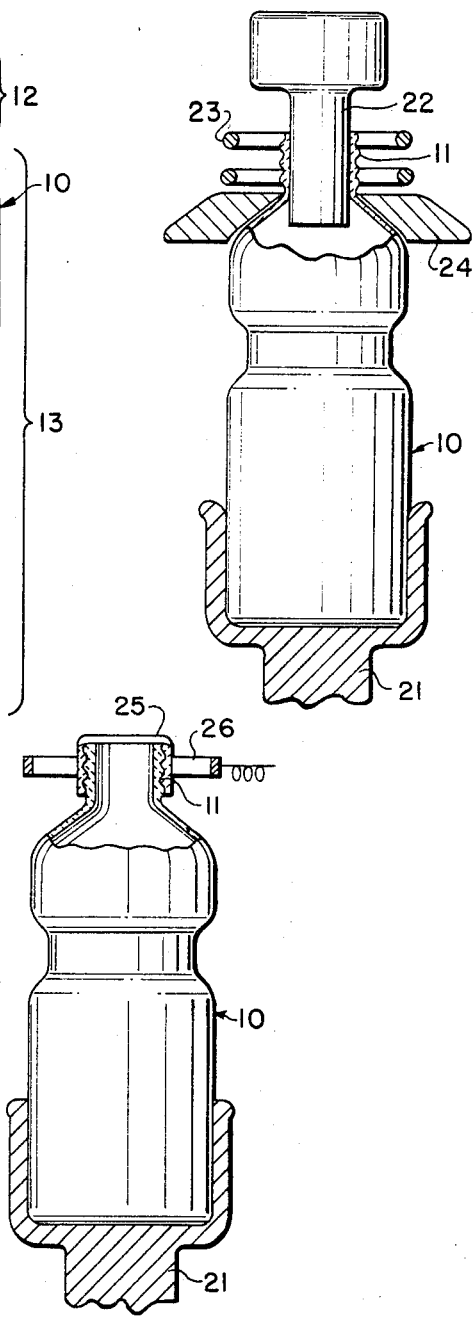
FIG. 2
FIG. 3

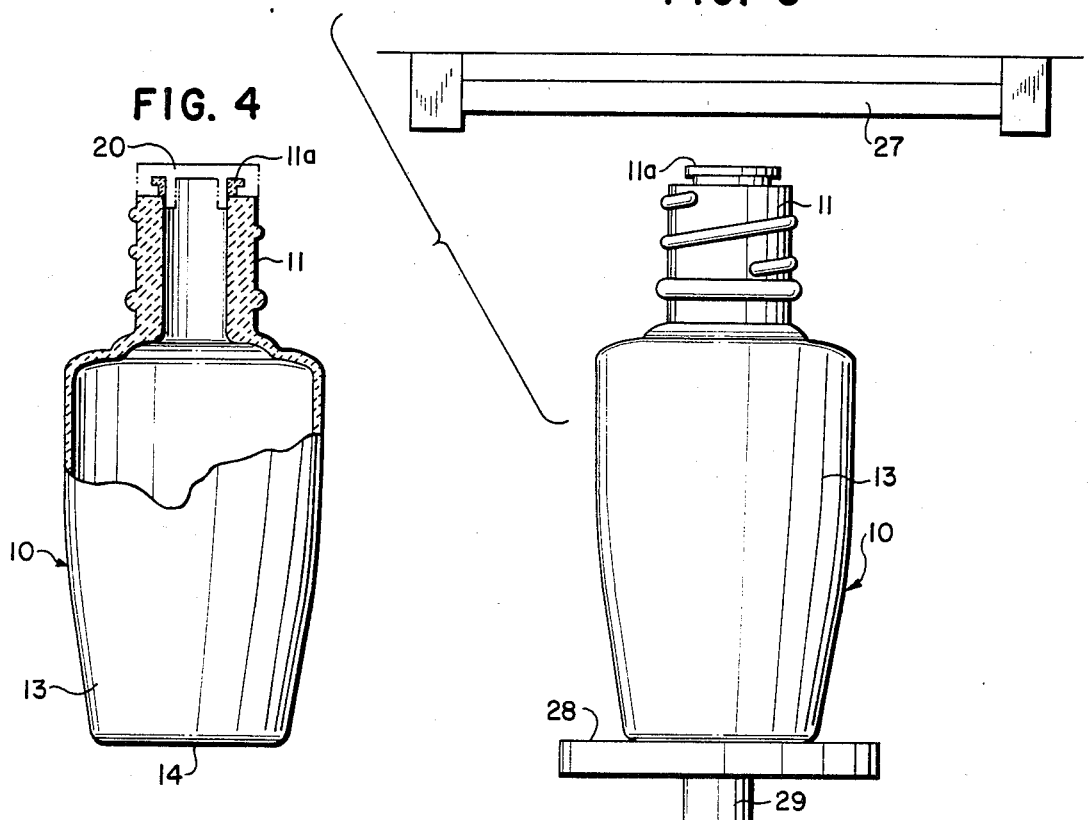
FIG. 4
FIG. 5
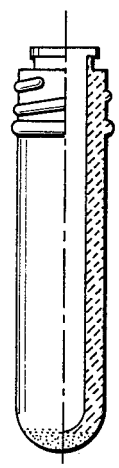
FIG. 6A
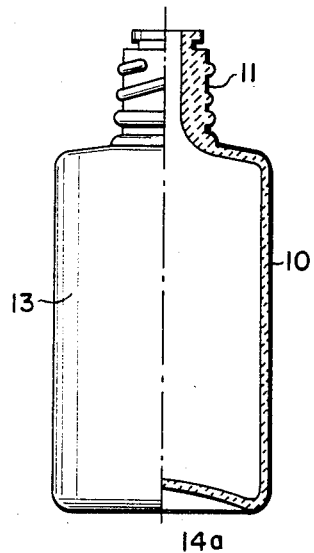
FIG. 6B
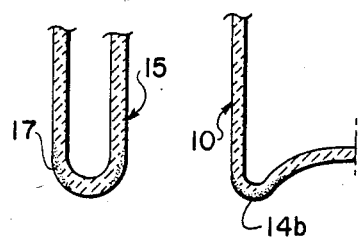
FIG. 7A   FIG. 7B
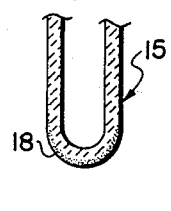
FIG. 8A   FIG. 8B
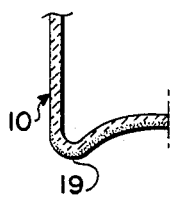

METHOD FOR PRODUCING POLYESTER CONTAINERS

RELATED APPLICATION

This application is a continuation-in-part of application Ser. No. 428,639 filed Sept. 30, 1982, now abandoned, which in turn is a continuation of application Ser. No. 317,887 filed Nov. 3, 1981, now U.S. Pat. No. 4,379,099, which in turn is a continuation of application Ser. No. 150,662 filed May 16, 1980, now abandoned, which in turn is a division of application Ser. No. 19,913 filed Mar. 12, 1979, now abandoned.

BACKGROUND OF THE INVENTION

The present invention relates to a hollow blow-molded container of a biaxially oriented polyester resin. More specifically, it relates to a process for manufacturing such a container of hollow bottle shape free from crazing regardless of the type of its contents, in which such sections as neck, neck end and/or bottom sections thereof (where the resin is not substantially subjected to orientation) are protected against thermal deformation.

Polyethylene terephthalate ("PET") has a wide range of applications in the field of containers for foodstuffs, flavoring materials, cosmetics and so on, because it can be molded, by orientation-blowing, into transparent thin-walled containers having high stiffness, impact strength and improved hygienic qualities. At the same time, it has high molding accuracy. In ordinary direct blow molding processes in which the top and bottom parts of an extruded parison are held by a mold and compressed air is blown into the thus held parison to expand the same into a container shape, resultant containers may often have unsatisfactory strength and transparency because the parison is oriented only monoaxially. Therefore, in blow molding, there prevails a so-called biaxially-orienting blow-molding process in which the parison is oriented not only laterally but also longitudinally in a temperature range suitable for such orientation. Biaxially-oriented blow-molded containers show increased stiffness and strength as well as improved gas barrier properties and transparency. However, even in such a biaxially-orienting blow-molding process, such sections as the neck, neck end and bottom of the resultant containers cannot exhibit sufficient improvement in physical properties and are susceptible to thermal deformation, because such sections are not subjected to orientation. That is to say, molecular orientation occurs only to a small (if any) extent, and the bond between the molecular chains constituting polymer crystals is not strong in these sections.

As is well-known, containers which are useful for storing volatile liquids require very tight sealing. Therefore, the neck ends of such containers are usually sealed with a crown cap caulked thereon or a cap placed thereon with interposed packing. However, if the neck section is deformed by some external factor such as heat, etc., the aforementioned sealing of the sealing means is diminished. If polyester containers are used to store highly-concentrated alcohol, ester, or cosmetics or solvents containing these, the aforementioned non-oriented sections may be permeated by the contents of the containers to be crazed and, eventually, allow the liquid contents to leak from the neck end of the container. Also, if such containers are filled with carbonated beverages, their bottoms may be bulged out due to high internal pressure and crazing to such an extent as to deteriorate their standing stability, sometimes even causing the containers to burst.

Furthermore, when such containers are used to store such liquids as juice or sauce that are filled thereinto after heat-sterilization, their neck or neck end portions may be deformed by the heat of the heat-sterilized contents to such an extent that the containers cannot be seated completely even with a cap having an inner sealing seat.

SUMMARY OF THE INVENTION

The present invention provides an improved method for producing a polyester container, especially a biaxially-oriented blow-molded polyester resin container, in which only those portions of the container such as neck, neck end and bottom sections, which are not substantially subjected to orientation, are heated and then annealed so as to increase the density of spherulite texture in such portions, thereby improving their thermal resistance, stiffness and content resistance to the same extent as those of the cylindrical, oriented sections of the container. The cylindrical section has molecules therein oriented by biaxial orientation and its physical properties, especially transparency and mechanical strength, are thereby improved. As a result of the aforementioned heat treatment, the neck and bottom sections are blushed by spherulite texture grown therein and their content resistance is further improved. These sections will not be crazed by penetration of contents such as alcohols, esters, surfactants or the like. Also, since the neck section becomes more tough, a cap or like capping means can be caulked or attached thereonto more stably. Further, since their thermal resistance is improved by the aforesaid heat treatment, the container may safely be filled with hotter contents.

Accordingly, an object of the present invention is to provide a bottle-shaped container of biaxially oriented blow-molded polyester resin, in which portions of the container where the resin is not substantially subjected to orientation are blushed and crystallized by growth of spherulite structure.

Another object of the present invention is to provide a bottle-shaped container of biaxially oriented blow-molded polyester resin, in which the density of spherulite texture in such sections of the container as neck, neck end, bottom center and/or bottom periphery, where the resin is not substantially subjected to orientation, is increased to prevent these sections from being deformed by heat or crazed by the action of the contents.

Yet another object of the present invention is to produce a container in a simplified manner, in which sections of a preformed piece which are not to be subjected to biaxial orientation in the succeeding blow molding process are subjected to heating and subsequent annealing in advance of blow molding to improve the thermal resistance and content resistance of these sections of the resultant container.

Still another object of the present invention is to produce a container, in which those sections of the container which are not substantially oriented in the preceding biaxial orientation-blow molding process are subjected to heating and subsequent annealing after said blow molding process, to improve the strength and content resistance of these sections to almost the same level as those of the oriented sections of the container.

BRIEF DESCRIPTION OF THE DRAWINGS

These and other objects and features of the present invention will become more apparent from the following description of the preferred embodiments of the present invention when read with reference to the accompanying drawings, in which:

FIG. 1 is a front view of a container according to the present invention, showing its neck section and a portion of its shoulder section in a partially broken form;

FIG. 2 is a sectional view of an apparatus of a preferred embodiment of the present invention used for heating the neck section of the container;

FIG. 3 is a partially broken section of an apparatus of another preferred embodiment of the present invention used for heating the neck section of the container;

FIG. 4 is a partially broken section of the container according to the present invention having an end portion of its neck section blushed and crystallized;

FIG. 5 is a front view of an apparatus for heating only an end portion of the neck section of the container;

FIG. 6A is a partially broken section of a preformed piece having its bottom center blushed and crystalized, and FIG. 6B is a partially broken section of a container obtained by biaxial orientation blow-molding the preformed piece of FIG. 6A;

FIG. 7A is a partially broken section of a preformed piece having its bottom periphery blushed and crystalized and FIG. 7B is a partially broken section of a container obtained by biaxial orientation blow-molding the preformed piece of FIG. 7A;

FIG. 8A is a partially broken section of a preformed piece which is blushed and crystallized wholly from the periphery to the center of its bottom, and FIG. 8B is a partially broken section obtained by biaxial orientation blow-molding the preformed piece of FIG. 8A.

DETAILED DESCRIPTION OF THE PREFERRED EMBODIMENTS

Referring now to the drawings, especially to FIG. 1, the reference numeral 10 denotes a hollow bottle-shaped container having a threaded neck section 11, a body section comprising a shoulder section 12 and cylindrical section 13, and bottom section 14. The container 10 is obtained by heating a preformed piece of polyethylene terephthalate and, in a mold, orienting the same first in the longitudinal direction and then blowing air thereinto to orient the same in the lateral direction. The shoulder, cylindrical and bottom sections of the container 10 of FIG. 1 which are biaxially oriented are transparent, but the neck section 11 with a higher density of spherulite texture shows a milky white color. Such a higher density of spherulite texture is attained by subjecting the neck section 11 to heating and subsequent annealing. Of course, the container may be produced in other colors by methods known to those of ordinary skill in the art.

Containers of biaxially oriented-blow molded polyethylene terephthalate resin are sometimes heat-set at a temperature somewhat above the softening point of the resin to improve their thermal resistance. In such a heat-setting process, the container body is appropriately held by a mold or like means to prevent thermal deformation. However, even with this protection, the neck section may often be deformed by heat to those dimensional accuracy. Therefore, the neck section is blushed and crystallized prior to heat-setting to improve its dimensional stability.

Various means may be devised for blushing and crystallizing the neck section 11 of the container 10, as exemplified by the preferred embodiment according to the present invention shown in FIG. 2.

In the preferred embodiment shown in FIG. 2, the container 10 is placed on a base rest 21, and a hold 22 is inserted in its neck section 11 for preventing inward deformation of the latter. In this embodiment, a heater 23 comprising an electromagnetic inductor is provided around the neck section 11. The heater heats by radiation and then anneals the neck section 11 to blush and crystallize the same. A shielding plate 24 may be provided directly beneath the heater 23 to prevent the influence of the radiant heat from reaching those portions of the bottle 10 below the neck section 11, such as the shoulder portion 12. Thus a sharp line of demarkation may be formed between the crystallized neck section and the un-crystallized body section. This line may desirably be located immediatley below or at the bottom edge of an annular projected ring or ledge 30. However, the location of this line of demarkation may be selected elsewhere to define the limit of the crystallized area according to the functional requirements of the container. The base rest 21 or hold 22 may be turned to rotate the container 10 relatively to the heater 23 so that the incident radiant heat is evenly distributed around the neck section 11.

Alternatively, in the foregoing preferred embodiment, instead of the hold 22, a metal cap 25 (for example, a split-cavity mold shape cap) may be placed on the neck section 11 to heat the same by applying the radiant heat through the metal cap 25.

Further, as shown in FIG. 3, the neck section 11 may be heated through the metal cap 25 which is fitted onto the neck section 11 and induction-heated by electrodes 26 provided externally of the metal cap 25. Thereafter, the neck section 11 is annealed to be blushed and crystallized. The metal cap 25 is removed after this processing.

In the latter case, the base rest 21 and the container 10 need not be rotated relative to the heater. Also, since only the neck section 11 is subjected to heating, the shielding plate 24 is not necessary. Especially, in the preferred embodiment using the cap 25, the neck section 11 can be positively heated alone without being deformed. Again, a sharp line of demarkation can thus be formed between the blushed and crystallized portion and the rest of the bottle.

Theoretically, the minimum temperature at which the resin material of the neck section 11 is crystallized is its glass transition point (about 70° C. for polyethylene terephthalate), and the shortest heating the required to crystallize the same is the time that elapses before crystal nuclei begin to be formed (about 2 minutes or more). Therefore, heat treatment for about 2 minutes or more at about 70° C. is sufficient to crystallize the resin material of the neck section 11.

In order to increase productivity without causing thermal deformation due to overheating, when the neck section 11 has a substantial thickness and the resin material does not have a high thermal conductivity, certain further limitations may be imposed on the heating time and temperature. As a result of a series of experiments, the inventors have found that a preferred range in which the neck section 11 is crystallized as shown in FIG. 1 without causing thermal deformation is from about 120° C. to 180° C. and, more preferably, from about 140° C. to 170° C. It is also preferable that, in the foregoing temperature range, the neck section 11 is heated for a sufficient time for the entire polyethylene terephthalate resin material thereof to be crystallized, preferably, for 3-8 minutes and, more preferably, for 3-5 minutes. Of course, the heating time varies substantially significantly depending upon the thickness of the neck section 11 and its ambient temperature.

The neck section 11 crystallized under the aforementioned heating conditions appears, in section, as shown in FIG. 1. The particular example shown in FIG. 1 was heated at 155° C. for 4 minutes and 30 seconds.

After being heated as mentioned herein-above, the neck section 11 is allowed to cool at room temperature for at least 30 seconds to have the density of spherulite texture increased over the entirety thereof, thereby being blushed and crystallized into a milky, opaque color.

As a result of this processing, since not only the crazing resistance of the neck section 11 but also its mechanical properties such as stiffness, impact resistance, abrasion resistance and external pressure resistance are considerably improved, any screwed cap or caulkable cap such as a crown cap that is fitted onto the neck section 11 having the thus improved mechanical strength can maintain the contents of the container 10 in a hermetically sealed state over a long period.

Also, the container thus heat-reinforced by the method according to the present invention is identifiable at a glance by its blushed neck section, and the extent of its heat reinforcement can be easily determined from the degree of blushing.

FIG. 4 shows a container having only its neck end 11a blushed and crystallized. In general, if the neck end is deformed or damaged by stress cracking in fitting thereinto an inner sealing seat 20 or if it is crazed by the content, the latter may leak out of the neck end. While, if the neck end 11a has its density of spherulite texture increased to be blushed and crystallized, the inner sealing seat 20 can be held in place and securely prevent leakage of the contents.

If a heater is placed directly above the container 10 to heat the neck end 11a, its upper end face is heated most strongly, but it must be heated evenly circumferentially. For this purpose, the container 10 may be held on a rotatable jig 28 as shown in FIG. 5.

The preferred embodiment of the heating equipment of FIG. 5 uses a far infrared ray bar heater 27 as its heating element. The heater 27 is disposed slightly spaced above and apart from the upper end of the container 10, and the container is placed on the base jig 28 fixed onto the upper end of a rotatable shaft 29 which is rotated at a constant speed. Since the container 10 is rotated relative to the heater 27 at a constant speed, the neck end 11a is heated evenly in the circumferential direction of the neck section 11, and the heat distribution around the neck end 11a is well improved.

The following table compares the densities of the sections of polyethylene terephthalate containers obtained in the aforementioned manner.

TABLE

|  | Container #1 | Density g/cm³ Container #2 |
|---|---|---|
| Neck end (blushed) | 1.3640 | 1.3582 |
| Neck section | 1.3436 | 1.3441 |
| Cylindrical | 1.3556 | 1.3555 |

TABLE-continued

|  | Container #1 | Density g/cm³ Container #2 |
|---|---|---|
| section |  |  |

Due to the increased density of the spherulite texture, the neck end has a greater density than the neck and cylindrical sections. The density of the neck end could be increased up to 1.37.

Although in the aforementioned preferred embodiment, the neck end is subjected to heat treatment after the blow-molding of the container, the neck end of a preformed piece constituting the primary molding of the container may be first subjected to heat treatment to be blushed and crystallized before being subjected to biaxial orientation-blow molding.

FIGS. 6A through 8B show modified preferred embodiments of the containers according to the present invention, in which the bottom section on a preformed piece is subjected to heat treatment to blush and crystallize, in advance, those sections of the container which are not to be substantially biaxially oriented in the succeeding process.

The preformed piece 15 obtained by injection or extrusion molding is hollow with thick walls and a prefinished threaded neck 11. As shown in FIG. 6A, the piece 15 has its bottom center 16 heated and annealed in a manner as mentioned previously and the bottom center 16 is blushed with its partially increased density of spherulite texture. The thus treated piece is then heated uniformly at 140° C.-220° C. before being biaxial orientation-blow molded in a mold into a hollow container. As shown in FIG. 6B, the grown spherulite texture at its bottom center 14a is maintained as it was and, thus, the bottom center can have sufficient strength against crazing and thermal deformation.

In the preferred embodiment shown in FIG. 7A, the cylindrical section of a preformed piece near its bottom has its periphery 17 heated and annealed, and the periphery 17 is blushed and crystallized with an increased density of spherulite texture. Likewise, the thus treated piece is then biaxial orientation-blow molded into a container as shown in FIG. 7B. As a result of this treatment, a spherulite texture develops in and along the bottom periphery 14b of the container 10 to increase its thermal resistance and to prevent deformation. In FIG. 8A, the preformed piece 15 has a section 18 from the bottom center to the bottom periphery heated and annealed so that the section 18 is blushed. Then, the thus treated piece is biaxial orientation-blow molded into a container 10 as shown in FIG. 8B having a developed spherulite texture in and over its entire bottom section 19 ranging from the center to the neighboring periphery.

According to the present invention, as described hereinbefore, those sections of a biaxial orientation-blow molded polyester resin container such as its neck, neck end and bottom sections which are not substantially oriented are subjected to heat treatment. This increases the density of spherulite texture in such sections, so that these sections are protected against deformation and crazing. Also, since the aforesaid sections having a spherulite texture present a milky white or opaque color which agreeably contrasts with the transparent cylindrical section, the container may obtain an attractive pattern according to the present invention.

What is claimed is:

1. A method for producing a hollow bottle-shaped container of biaxially oriented polyethylene terephthalate having a non-biaxially oriented neck section, a bottom section, and a biaxially oriented body section extending between said neck section and bottom section from a preform having a prefinished neck section, said method comprising the steps of:

heating only the prefinished neck section of said preform to a heating temperature of at least the glass transition temperature of the preform for a heating time at least long enough to begin formation of crystal nuclei, and thereafter cooling the neck section to increase the density of the spherulitic texture only in the neck section to produce a preform having a crystallized area only in the neck section and the remainder of the preform being uncrystallized, and thereafter biaxially orienting in a mold only the regions of the preform below said neck section, including those immediately therebelow, to form the hollow bottle-shaped container with a crystallized area only in the neck section.

2. A method according to claim 1, wherein said heating temperature is at least 70° C.

3. A method according to claim 2, wherein said heating temperature is in the range of about 120°-180° C.

4. A method according to claim 3, wherein said heating temperature is in the range of about 140°-170° C.

5. A method according to claim 1, wherein said heating time is 3-8 minutes.

6. A method according to claim 3, wherein said heating time is 3-8 minutes.

7. A method according to claim 4, wherein said heating time is 3-5 minutes.

8. A method according to claim 1, wherein the entire neck section is heated and cooled so that said entire neck section is crystallized.

9. A method according to claim 1, wherein only an upper end portion of said prefinished neck section is heated and cooled so that only said upper end portion of said neck section is crystallized.

10. A method according to claim 1, wherein said prefinished neck section is threaded.

11. A method according to claim 1, wherein said heating element comprises an electromagnetic induction heating device, and a metal ring is fitted onto the outside of said neck section of the preform as a heating medium.

12. A method according to claim 9, wherein said upper end portion of said prefinished neck section is heated by means of a far infrared ray bar heater.

13. A method according to claim 8, wherein said entire neck section is heated by means of a radiant heater surrounding said neck section, and a portion of said preform immediately adjacent said neck section is shielded from thermal influence of said radiant heater by means of a shielding plate.

* * * * *